(12) United States Patent
Bock et al.

(10) Patent No.: US 11,859,680 B2
(45) Date of Patent: Jan. 2, 2024

(54) BRAKE DUST PARTICLE FILTER, BRAKE CALIPER AND DISC BRAKE ASSEMBLY

(71) Applicant: MANN+HUMMEL GmbH, Ludwigsburg (DE)

(72) Inventors: Lukas Bock, Bietigheim-Bissingen (DE); Thomas Jessberger, Asperg (DE); Volker Kuemmerling, Bietigheim-Bissingen (DE); Coskun Evlekli, Waiblingen (DE); Benedikt Weller, Steinheim Kleinbottwar (DE); Axel Kravanja, Boebingen an der Rems (DE); Eric Thébault, Ludwigsburg (DE); Andreas Beck, Kirchheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 302 days.

(21) Appl. No.: 17/245,362

(22) Filed: Apr. 30, 2021

(65) Prior Publication Data

US 2021/0246953 A1 Aug. 12, 2021

Related U.S. Application Data

(63) Continuation of application No. PCT/EP2019/077324, filed on Oct. 9, 2019.

(30) Foreign Application Priority Data

Oct. 30, 2018 (DE) ..................... 10 2018 127 039.9

(51) Int. Cl.
*F16D 65/092* (2006.01)
*F16D 65/00* (2006.01)
(Continued)

(52) U.S. Cl.
CPC ....... *F16D 65/0031* (2013.01); *F16D 55/226* (2013.01); *F16D 65/0068* (2013.01);
(Continued)

(58) Field of Classification Search
CPC ............ F16D 65/0031; F16D 65/0068; F16D 65/0081; F16D 55/226; F16D 2055/0016; F16D 2055/2055
(Continued)

(56) References Cited

U.S. PATENT DOCUMENTS 4,768,423 A * 9/1988 Boeger ................ B60H 3/0641
454/146
5,035,304 A * 7/1991 Bosch ................. F16D 65/0031
188/73.31
(Continued)

FOREIGN PATENT DOCUMENTS

DE 202005006844 U1 7/2005
DE 102016108793 A1 11/2017
(Continued)

*Primary Examiner* — Christopher P Schwartz

(57) ABSTRACT

A brake dust particle filter for a brake caliper of a disc brake assembly, wherein the brake caliper comprises a lining inspection opening, closes in a mounted state thereof the lining inspection opening at least partially with precise fit. The brake dust particle filter is provided with a filter medium support that supports a filter medium. A brake caliper provided with the brake dust particle filter in the lining inspection opening is arranged across the brake disc of the disc brake assembly.

25 Claims, 3 Drawing Sheets

(51) Int. Cl.
*F16D 55/226* (2006.01)
*F16D 55/00* (2006.01)

(52) U.S. Cl.
CPC .. *F16D 65/0081* (2013.01); *F16D 2055/0016* (2013.01); *F16D 2055/0037* (2013.01)

(58) Field of Classification Search
USPC .... 188/71.1, 72.2–72.5, 73.31, 73.41, 73.43, 188/73.46, 218 A, 218 R
See application file for complete search history.

(56) References Cited

U.S. PATENT DOCUMENTS

| | | | | |
|---|---|---|---|---|
| 5,772,713 | A * | 6/1998 | Salinas | B01D 46/10 |
| | | | | 359/882 |
| 8,276,718 | B2 * | 10/2012 | Bach | F16D 55/226 |
| | | | | 188/73.43 |
| 9,388,867 | B2 * | 7/2016 | Hummel | F16D 65/092 |
| 2007/0000740 | A1 * | 1/2007 | Raab | F16D 65/0031 |
| | | | | 188/218 A |
| 2010/0065387 | A1 | 3/2010 | Tsiberidis | |
| 2014/0054119 | A1 | 2/2014 | Hummel et al. | |
| 2014/0054121 | A1 * | 2/2014 | Hummel | F16D 65/0031 |
| | | | | 55/522 |
| 2017/0198772 | A1 | 7/2017 | Rocca-Serra | |
| 2022/0397168 | A1 * | 12/2022 | Woerz | F16D 65/0031 |

FOREIGN PATENT DOCUMENTS

| | | |
|---|---|---|
| DE | 102017201736 A1 | 8/2018 |
| KR | 20120060463 A | 6/2012 |

* cited by examiner

BRAKE DUST PARTICLE FILTER, BRAKE CALIPER AND DISC BRAKE ASSEMBLY

CROSS-REFERENCE TO RELATED APPLICATIONS

This application is a continuation application of international application No. PCT/EP2019/077324 having an international filing date of 9 Oct. 2019 and designating the United States, the international application claiming a priority date of 30 Oct. 2018 based on prior filed German patent application No. 10 2018 127 039.9, the entire contents of the aforesaid international application and the aforesaid German patent application being incorporated herein by reference.

BACKGROUND OF THE INVENTION

The invention concerns a brake dust particle filter and a brake caliper as well as a disc brake assembly.

It is known to catch particles that are produced by brake abrasion with a brake dust particle filter and to dispose of them. Such particles are produced by friction between brake lining and brake disc of a disc brake. Such a brake dust particle filter is disclosed, for example, in DE 10 2012 016 835 A1. This brake dust particle filter requires however an integration in a brake caliper housing and is therefore not suitable as a retrofitting solution.

A further brake dust particle filter is disclosed in U.S. Pat. No. 8,025,132 B2. A housing that is fastened at the brake caliper and encloses at least partially circumferentially the brake disc is provided here. The housing of the brake dust particle filter extends moreover to some extent in the circumferential direction radially outwardly past the brake caliper in order to be able to catch particles that are produced there. A suction line is connected to the housing by means of which the caught particles are sucked away.

DE 10 2016 108 793 A discloses moreover a fully encapsulated disc brake assembly whose housing comprises a cutout for the brake caliper and otherwise encloses the brake disc completely.

The brake dust particle filters disclosed in the prior art all have the disadvantage that they—in relation to the axis of rotation of the brake disc—require space for installation in circumferential direction as well as in radial direction. In particular, installation space in radial direction is often not available because ever-larger brake assemblies are installed so that the annular gap between brake caliper wall surface and wheel rim well becomes smaller and smaller.

In addition, the solutions which are known in the prior art are not suitable for retrofitting by the end user because, as needed, additional fastening points at the brake caliper, chassis parts and/or steering knuckle must be created which cannot be expected from a layperson.

SUMMARY OF THE INVENTION

It is therefore object of the present invention to provide a brake dust particle filter that requires a significantly reduced installation space and can be retrofitted particularly easily, preferably even by an end user.

This object is solved by a brake dust particle filter that is characterized in that the brake dust particle filter is embodied to close in a mounted state the lining inspection opening of the brake caliper at least partially with precise fit.

The object is further solved by a brake caliper that comprises at least one caliper bridge extending in axial direction with a lining inspection opening arranged therein and that is characterized in that the lining inspection opening is closed at least partially with precise fit by a brake dust particle filter as claimed in accordance with the invention.

The object is further solved by a disc brake assembly with at least one brake disc and a brake caliper, wherein the brake caliper is a brake caliper as claimed in accordance with the invention.

The brake dust particle filter according to the invention is suitable for arbitrary applications of disc brakes, in mobile as well as in stationary applications. In regard to mobile applications, it can be used, for example, in passenger cars, trucks, buses, rail vehicles. In regard to stationary applications, it can be used, for example, in axle brakes as they are used in wind power devices.

Positional and directional specifications such "top", "bottom" etc. relate to the installed state of the brake dust particle filter, i.e., the mounted state, wherein cylinder coordinate specifications such as "radial", "axial", "circumferential" etc. relate to a rotational direction of the brake disc in the mounted state of the brake dust particle filter.

The brake dust particle filter according to the invention for a brake caliper of a disc brake assembly in a first embodiment is embodied so as to close in a mounted state a lining inspection opening of the brake caliper at least partially with precise fit. Preferably, the brake dust particle filter according to the invention closes exclusively the lining inspection opening and does not cover other brake caliper openings. In some embodiments, the brake dust particle filter according to the invention however can be combined with other brake dust particle filters in order to further increase the total separation efficiency of particles even more, for example.

A multitude of conventional brake calipers has a lining inspection opening that enables inspection of a wear condition of the brake linings without having to demount the brake caliper. In general, such a lining inspection opening is present in a wall surface of the brake caliper so that the opening, in relation to the axis of rotation of the brake disc, is open in radial direction so that the lining condition can be evaluated in a viewing direction parallel to the friction surfaces of the brake disc.

The applicant has found that a significant proportion of the particles produced during braking are discharged through the lining inspection opening.

The brake dust particle filter according to the invention now enables elimination of this particle emission source quickly and simply in that the lining inspection opening is closed by a filter. This is possible in such a simple way that this can be carried out even by the end user himself, for example, in the context of changing wheels. In addition, the construction according to the invention is extremely space-saving; in particular in radial direction, an extremely minimal installation space is required. The invention is not limited to an application of the brake dust particle filter according to the invention in the lining inspection opening but, in all embodiments, is transferable analogously also onto other caliper openings which have comparable dimensions.

Preferably, the brake dust particle filter is embodied at least in sections thereof so that it can be flowed through by a fluid so that air that is laden with brake dust can pass through it with separation of the brake dust particles.

In a further embodiment, the brake dust particle filter in the mounted state can close at least 60%, preferably at least 80%, most preferred at least 90%, of the lining inspection opening. In this context, "closing" does not mean "making flow-tight" but covering the lining inspection opening in regard to its cross section. Herein, "precise fit" means a structure of the brake dust particle filter which is matched to the shape and dimensions of the lining inspection opening wherein, in differentiation thereto, concepts of brake dust particle filters that are known in the prior art indeed close the lining inspection opening only by a housing end section.

According to a preferred further embodiment, the brake dust particle filter at least in sections thereof can be insertable into the lining inspection opening. Herein, "insertable" is understood as an at least partial countersinking of the brake dust particle filter below a surface of the brake caliper so that a required installation space, in particular in radial direction, can be still further reduced in this way. Preferably, the brake dust particle filter does not project at all past the brake caliper in radial direction so that the integration of the brake dust particle filter is possible in a neutral manner in regard to installation space.

Further preferred, the brake dust particle filter can comprise a filter medium which closes with precise fit the lining inspection opening in the mounted state. Through it, air that is laden with brake dust and that circulates due to the rotation of the brake disc can be filtered in that it flows through the filter medium. According to this embodiment, the brake dust is not only caught but filtered and bound in or at the filter medium so that it can no longer be discharged.

The filter medium is preferably designed such that it is stable even at a temperature of more than 600° C. in order to be able to withstand the temperatures in immediate vicinity of the disc brake. In this context, the filter medium can comprise a metal, in particular a metal fiber nonwoven, glass, ceramic and/or a high temperature resistant plastic material, in particular, polyether ether ketone. As an alternative thereto, foamed metals and/or ceramics as filter medium are possible also. The filter medium can be provided either as a flexible flat material or as a bending-stiff shaped filter.

According to a further embodiment that is also preferred, the brake dust particle filter can comprise a filter medium support that at least in sections thereof is embodied so that is can be flowed through by a fluid, preferably is provided with a plurality of through openings that enable flow through the filter medium. The filter medium support is matched to the shape and dimensions of the lining inspection opening of the brake caliper and is insertable into it. The filter medium support holds the filter medium in the mounted state safely in the lining inspection opening so that it cannot fall out even under the action of vibrations and temperature changes.

The filter medium support can be produced preferably of a heat-resistant material, in particular of a metallic material, in particular of steel. It can be preferably a sheet metal part which can be obtained by means of at least one forming process.

Alternatively, the filter medium can be embodied as a shaped filter so that it can have a sufficiently large stiffness even without a support and therefore, with suitable means, can be directly received in the lining inspection opening.

According to a further embodiment, the filter medium support can comprise at least one clamping hook, preferably at least three clamping hooks, that are configured to hold the filter medium support in the mounted state in the lining inspection opening. In this context, the clamping hooks have particularly preferred a radial extension which is matched to a material thickness of the brake caliper in a rim region surrounding the lining inspection opening so that the clamping hooks in the mounted state engage behind the lining inspection opening. The clamping hooks provide moreover preferably an elastic pretension so that a safe hold of the brake dust particle filter is ensured even at great temperature fluctuations, which is frequently the case in immediate vicinity of a brake.

The filter medium is arranged in particular on the filter medium support, preferably in such a way that it is arranged radially inwardly positioned in the mounted state. The filter medium support in this context is positioned radially outwardly and protects the filter medium from outer mechanical action such as pointed objects and/or during use of a steam cleaner.

Particularly preferred, the filter medium can be connected, preferably welded, preferably spot welded, at least at locations thereof to the filter medium support.

Moreover, in an also preferred further embodiment, it is provided that the filter medium support comprises at least one radial stop that is embodied preferably as a tongue, wherein the radial stop is embodied to be supported in the mounted state at a rim region of the lining inspection opening. Due to the radial stop, a defined installation depth with regard to a receptacle of the brake dust particle filter in the lining inspection opening is enabled so that it cannot be pushed in too far which entails the risk of coming into contact with the brake disc.

Finally, the brake dust particle filter can comprise at least one opening extending in radial direction with a predetermined axial extension, in particular a slotted hole, wherein through the opening at least one indicator, preferably a pointer, is guided which in a mounted state can be brought into interaction with at least one brake lining of the brake caliper for detection of a brake lining thickness. In an embodiment with filter medium and filter medium support, the opening penetrates expediently the filter medium support as well as the filter medium. The indicator can be embodied in particular as a sheet metal plate that extends from outside of the brake dust particle filter at least so far radially inwardly that a piston position can be detected with it, for example. By means of the indicator, the piston position which directly corresponds to the wear of the linings is then indicated, visually readable from the exterior.

A further aspect of the invention concerns a brake caliper for a disc brake assembly that comprises at least one caliper bridge extending in axial direction with a lining inspection opening provided therein. The lining inspection opening is closed with precise fit by a brake dust particle filter according to the invention. A caliper bridge is understood herein as the axial connection between the jaws of the brake caliper extending on two sides of the brake disc which are provided at the brake caliper for introducing the braking force into the friction linings. The inspection opening is provided in the caliper bridge because from there the condition of both brake linings as well as the condition of a piston seal can be viewed.

For servicing purposes, the brake dust particle filter according to the invention can be removed quickly and simply with a few manipulations from the lining inspection opening whereupon the control work can be performed as usual. The brake dust particle filter can be connected in this context by a detachable connection assembly, e.g., screws, to a brake caliper body. Alternatively, embodiments are also encompassed in which the brake dust particle filter is connected, for example, glued or welded, to the brake caliper body so as to be detachable only by causing destruction.

According to a preferred further embodiment, the brake dust particle filter is connected to a brake caliper body of the brake caliper, in particular in a rim region of the lining inspection opening, by a pivotable connection assembly, in particular with at least one hinge. This provides the advantage that the brake dust particle filter in a servicing situation for control of the brake linings can be simply folded away and, after completion of visual inspection, can be folded again over the lining inspection opening. In this way, the risk of losing the brake dust particle filter is reduced and time is saved during servicing. The pivotable connection assembly can engage in particular the filter medium support and/or comprise a pivot axis parallel or normal to the rotation axis of the brake disc.

A last aspect of the invention concerns a brake disc assembly with at least one brake disc and a brake caliper according to the invention with a brake dust particle filter according to the invention.

According to a further embodiment, the disc brake assembly comprises a splash guard cover, in particular a splash guard plate which at least partially covers the brake disc circumferentially, wherein the brake dust particle filter of the brake caliper is fastened to the splash guard cover, in particular is integrally formed thereat as one piece. Herein, "integrally formed" means originally one-piece constructions, such as primary shaped or shaped components, as well as joined constructions, for example, a welded construction, of splash guard cover and brake dust particle filter.

Further advantages of the invention result from the description and the drawing. Also, the features which have been disclosed above and which are yet to be further disclosed can be employed in accordance with the invention individually as well as a multitude thereof combined in arbitrary combinations. The illustrated and described embodiments are not to be understood as a final listing but instead have an exemplary character for describing the invention.

DESCRIPTION OF PREFERRED
EMBODIMENTS

Figure 1:
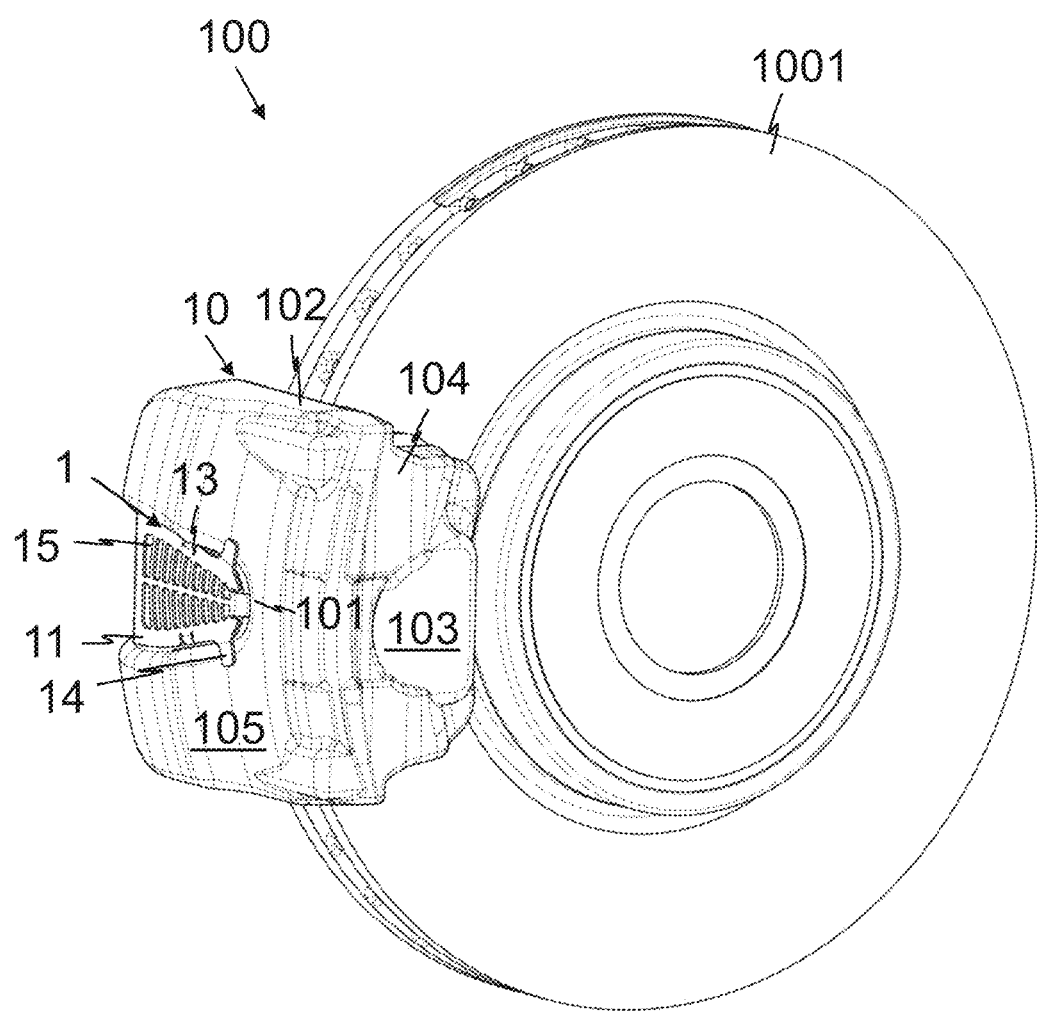
FIG. 1 shows an isometric view of a disc brake assembly according to the invention.

The disc brake assembly 100 according to the invention is illustrated in FIG. 1 in an isometric view. It comprises a brake disc 1001 which is engaged across by a brake caliper 10 which is a carrier of two brake linings 103. The brake disc 1001 is mountable on a shaft or an axle support and can then be used in a vehicle (passenger car, truck, rail vehicle) or in a stationary device. The brake caliper 10 comprises an outwardly positioned jaw 104 which extends parallel to the friction surface of the brake disc 1001 wherein through the jaw 104 the brake force can be applied to the friction linings 103. It has a second inner jaw at an end of the brake caliper 10 which cannot be seen in the drawing and is axially facing away. For the invention, it is of no consequence which principle the brake caliper employs for generating the brake force. It can be an electrically, hydraulically or pneumatically actuated brake caliper.

The outer jaw 104 and the inner jaw that is not illustrated are connected for force transmission by a caliper bridge 102 in which a lining inspection opening 101 is provided by means of which in a servicing situation the wear condition of the friction linings 103 can be easily and quickly determined, i.e., without demounting.

In a conventional disc brake assembly, the lining inspection opening is always open so that a significant proportion of the brake dust which is produced during braking also reaches the environment through this opening; this has been determined by the applicant in experiments.

According to the invention, the lining inspection opening 101 is closed by a brake dust particle filter 1 which is inserted with precise fit therein. The brake dust particle filter 1 does not project in radial direction past the outer contour of the brake caliper 10 so that it does not require additional installation space. Moreover, its installation is possible very quickly and easily by simple insertion so that this can be done even by an end user.

Figure 2:
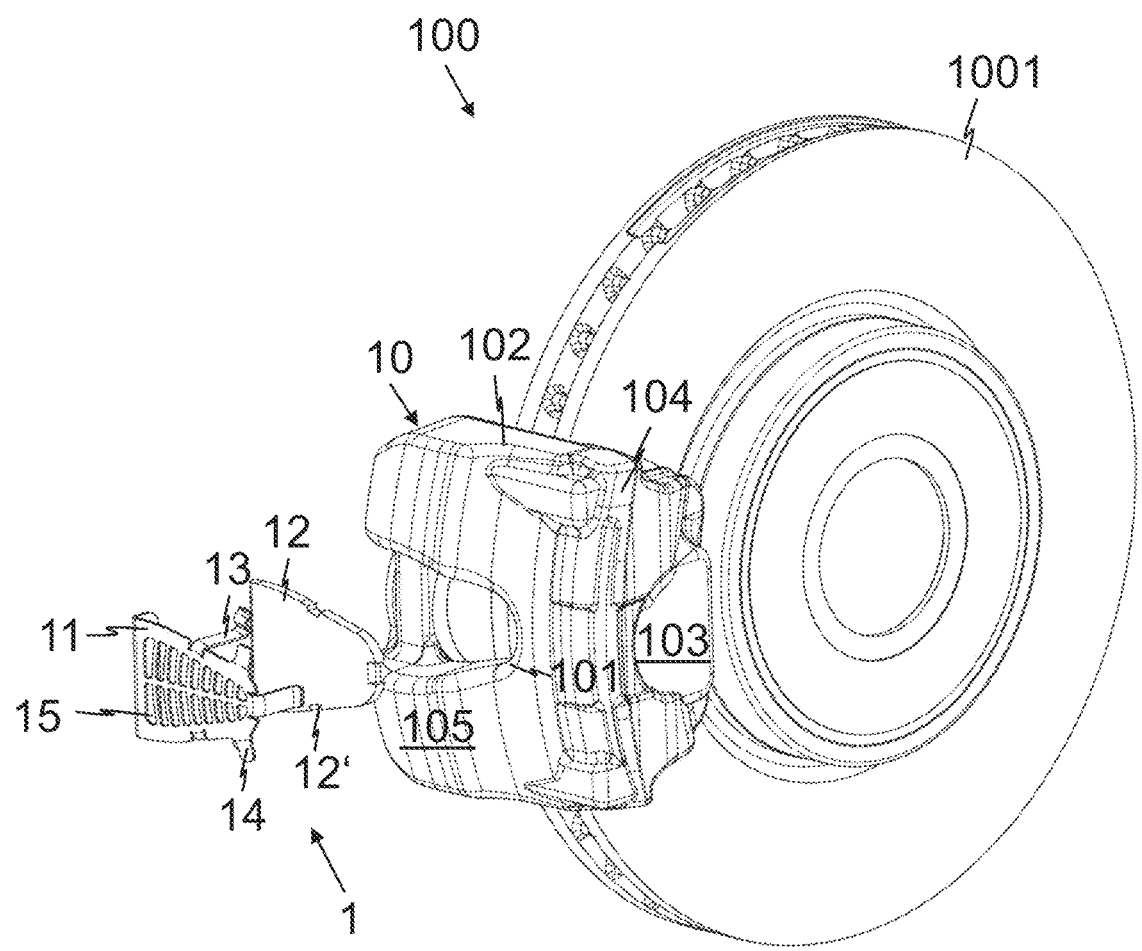
FIG. 2 shows an isometric exploded view of the disc brake arrangement.
Figure 3:
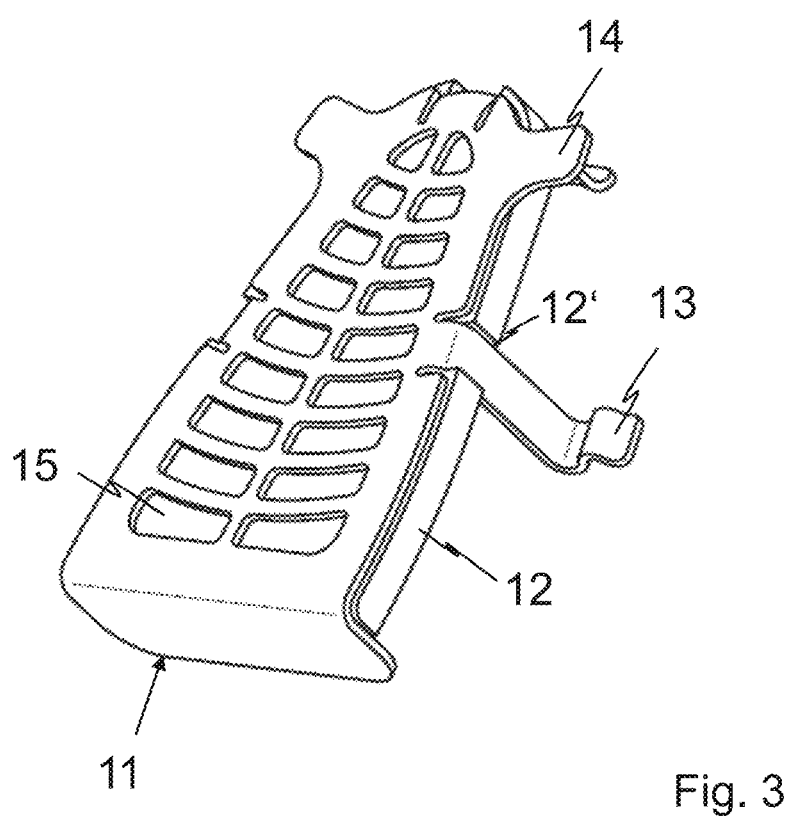
FIG. 3 shows an isometric view of a brake dust particle filter according to the invention.

The construction of the brake dust particle filter 1 itself can now be seen in FIGS. 2 and 3. The brake dust particle filter 1 according to the illustrated embodiment is of a two-part configuration: it has (a) a filter medium support 11 and (b) a filter medium 12 which is held by the filter medium support 11. The filter medium support 11 is provided with a plurality of through openings 15 that enable flow through the filter medium 12. The filter medium support 11, with regard to its shape and dimensions, is matched to the lining inspection opening 101 so that it can be inserted with proper fit into it. For fastening the filter medium support 11 in the lining inspection opening 101, it comprises clamping hooks 13 whose length corresponds to the material thickness of the brake caliper 10 wherein the clamping hooks 13 can be locked with their respective angled end section behind the lining inspection opening 101. In order for the brake dust particle filter 1 to not be inserted too far radially (=depth direction) into the lining inspection opening 101, at the filter medium support 11 projecting radial stops 14 embodied as tongues are provided, respectively, which are in contact with the wall surface 105 of the brake caliper 10 in the mounted state (FIG. 1).

The filter medium 12 is in the present case a flat material, for example, a metal or ceramic nonwoven, which is tailored to the shape and dimensions of the filter medium support 11 and, provided with cutouts 12' for the clamping hooks 13, connected, for example, welded, to the filter medium support 11. In certain embodiments, the filter medium 12 can also be connected detachably to the filter medium support 11, for example, only frictionally clamped.

When the brake dust particle filter 1 is to be exchanged, this can be done quickly and simply in the context of the regular wheel change and/or during other servicing work at the brake assembly. In case of a full metal variant (filter medium of metal and filter medium support of metal), a problem-free and resource-saving recyclability is provided in addition.

LIST OF REFERENCE CHARACTERS

10 brake caliper
101 lining inspection opening
102 caliper bridge
103 friction linings
104 outer jaw
105 wall surface
100 disc brake assembly
1001 brake disc
1 brake dust particle filter
11 filter medium support
12 filter medium
12' cutouts of the filter medium for clamping hooks 13 clamping hook
14 radial stop
15 through openings

What is claimed is:

1. A brake dust particle filter for a brake caliper of a disc brake assembly, wherein
the brake caliper comprises
a lining inspection opening,
wherein the brake dust particle filter is configured to close in a mounted state thereof the lining inspection opening at least partially with precise fit,
wherein the brake dust particle filter comprises
at least one opening extending in a radial direction with a predetermined axial extension,
wherein through the at least one opening at least one indicator can be guided,
wherein the indicator, in the mounted state of the brake dust particle filter, is configured to be brought into interaction with at least one brake lining of the brake caliper for detection of a brake lining thickness.

2. The brake dust particle filter according to claim 1, wherein
the brake dust particle filter comprises
a filter medium support configured to be flowed through by a fluid at least in sections thereof,
wherein the filter medium support is matched to a shape and dimensions of the lining inspection opening and is configured to be inserted into the lining inspection opening.

3. The brake dust particle filter according to claim 2, further comprising
a filter medium arranged on the filter medium support.

4. The brake dust particle filter according to claim 3, wherein
the filter medium is at least at some locations thereof connected to the filter medium support.

5. The brake dust particle filter according to claim 4, wherein
the filter medium is welded to the filter medium support.

6. The brake dust particle filter according to claim 3, wherein
the filter medium is arranged radially inwardly in relation to the filter medium support in the mounted state of the brake dust particle filter.

7. The brake dust particle filter according to claim 1, wherein
the brake dust particle filter comprises
a filter medium closing the lining inspection opening at least partially with precise fit in the mounted state of the brake dust particle filter.

8. The brake dust particle filter according to claim 7, wherein
the filter medium comprises or is comprised of
a heat-resisting material.

9. The brake dust particle filter according to claim 8, wherein
the heat-resisting material is selected from the group consisting of a metal, a metal fiber nonwoven, glass, ceramic, a high temperature resistant plastic material, and combinations thereof.

10. The brake dust particle filter according to claim 2, wherein
the filter medium support comprises
at least one stop configured to be supported in the mounted state of the brake dust particle filter at the brake caliper.

11. The brake dust particle filter according to claim 10, wherein
the at least one stop is configured to be supported at a rim region of the lining inspection opening.

12. The brake dust particle filter according to claim 10, wherein
the at least one stop is a radial stop formed as a tongue.

13. The brake dust particle filter according to claim 2, wherein
the filter medium support comprises
at least one clamping hook configured to hold the filter medium support in the lining inspection opening in the mounted state of the brake dust particle filter.

14. The brake dust particle filter according to claim 13, wherein
the at least one clamping hook comprises
a radial extension matched to a material thickness of the brake caliper in a rim region surrounding the lining inspection opening so that the at least one clamping hook engages from behind the lining inspection opening in the mounted state of the brake dust particle filter.

15. The brake dust particle filter according to claim 1, wherein
the brake dust particle filter is configured at least in sections thereof to be flowed through by a fluid.

16. The brake dust particle filter according to claim 1, wherein
the brake dust particle filter in the mounted state thereof closes at least 60% of the lining inspection opening.

17. The brake dust particle filter according to claim 1, wherein
the brake dust particle filter is configured to be inserted at least with sections thereof into the lining inspection opening.

18. The brake dust particle filter according to claim 2, wherein
the filter medium support comprises
a plurality of through openings configured to be flowed through by the fluid.

19. A brake caliper for a disc brake assembly, the brake caliper comprising:
at least one caliper bridge extending in an axial direction of the brake caliper;
wherein the brake caliper further comprises a lining inspection opening arranged in the at least one caliper bridge;
a brake dust particle filter arranged in the lining inspection opening and closing the lining inspection opening at least partially with precise fit,
wherein the brake dust particle filter is connected to a brake caliper body of the brake caliper by a pivotable connection assembly.

20. The brake caliper according to claim 19, wherein
the pivotable connection assembly comprises
at least one hinge.

21. The brake caliper according to claim 19, wherein
the brake dust particle filter is connected to the brake caliper body of the brake caliper in a rim region of the lining inspection opening.

22. A disk brake assembly comprising:
a brake disc;
a brake caliper comprising
at least one caliper bridge extending in an axial direction of the brake caliper across the brake disc,
wherein the brake caliper comprises a lining inspection opening arranged in the at least one caliper bridge, and
wherein the brake caliper further comprises
a brake dust particle filter for the brake caliper of the disc brake assembly,
   wherein the brake dust particle filter is arranged in the lining inspection opening and closing the lining inspection opening at least partially with precise fit,
the disk brake assembly further comprising
   a splash guard cover covering at least partially the brake disc circumferentially,
wherein the brake dust particle filter of the brake caliper is fastened to the splash guard cover.

23. The disk brake assembly according to claim 22, wherein
the brake dust particle filter of the brake caliper is formed integrally as one piece with the splash guard cover.

24. A brake dust particle filter for a brake caliper of a disc brake assembly, wherein
the brake caliper comprises
   a lining inspection opening,
wherein the brake dust particle filter is configured to close in a mounted state thereof the lining inspection opening at least partially with precise fit,
wherein the brake dust particle filter comprises
   a filter medium support configured to be flowed through by a fluid at least in sections thereof,
   wherein the filter medium support is matched to a shape and dimensions of the lining inspection opening and is configured to be inserted into the lining inspection opening,
wherein the filter medium support comprises
   at least one clamping hook configured to hold the filter medium support in the lining inspection opening in the mounted state of the brake dust particle filter,
wherein the at least one clamping hook comprises
   a radial extension matched to a material thickness of the brake caliper in a rim region surrounding the lining inspection opening so that the at least one clamping hook engages from behind the lining inspection opening in the mounted state of the brake dust particle filter.

25. A brake dust particle filter for a brake caliper of a disc brake assembly, wherein
the brake caliper comprises
   a lining inspection opening,
wherein the brake dust particle filter is configured to close in a mounted state thereof the lining inspection opening at least partially with precise fit,
wherein the brake dust particle filter comprises
   a filter medium support configured to be flowed through by a fluid at least in sections thereof,
   wherein the filter medium support is matched to a shape and dimensions of the lining inspection opening and is configured to be inserted into the lining inspection opening,
wherein the filter medium support comprises
   at least one stop configured to be supported in the mounted state of the brake dust particle filter at the brake caliper,
wherein the at least one stop is a radial stop formed as a tongue.

* * * * *